March 6, 1962  R. H. BRISTOW  3,023,492
METALIZED CERAMIC MEMBER AND COMPOSITION AND
METHOD FOR MANUFACTURING SAME
Filed Nov. 19, 1958

INVENTOR:
ROBERT H. BRISTOW,
BY Philip L. Schlang
HIS ATTORNEY.

United States Patent Office 3,023,492
Patented Mar. 6, 1962

3,023,492
METALIZED CERAMIC MEMBER AND COMPOSITION AND METHOD FOR MANUFACTURING SAME
Robert H. Bristow, Ballston Lake, N.Y., assignor to General Electric Company, a corporation of New York
Filed Nov. 19, 1958, Ser. No. 774,881
24 Claims. (Cl. 29—195)

My invention relates to improved metalized ceramic members and improved methods of and compositions of materials for applying an intimately bonded metallic coating to a ceramic surface. More particularly, my invention relates to the production of metalized ceramic members of very high alumina content and means and methods for producing vacuum-tight, ceramic-to-ceramic and ceramic-to-metal seals in electric discharge devices, using such ceramic members as insulators in the envelope constructions thereof.

A simplified flow diagram of the process for metalizing a ceramic member according to my invention is as follows:

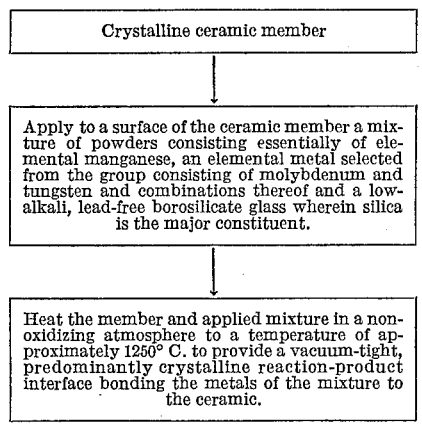

In the manufacture of electric discharge devices, and especially high frequency devices, ceramic insulators have, in many cases, replaced glass insulators due to the ability of ceramic to withstand high processing and operating temperatures and to its ability to afford lower power losses, greater mechanical strength and higher thermal shock resistance. Examples of ceramics which have been used include forsterite, feldspathic, zircon, steatite, and alumina porcelains. Most of these ceramics are polyphase materials and consist of one or more crystalline phases bonded by a relatively smaller proportion of a glassy phase. The alumina porcelains, for example, consist essentially of 85% or more of aluminum oxide present as crystalline alpha alumina (corundum) bonded by a high temperature alkaline earth alumino silicate glass. With these types of ceramics it has heretofore been possible to obtain satisfactory metalized coatings for effecting metallic bonds to other elements by applying refractory metal powders directly to a surface portion of a ceramic body and then firing the body to sinter the metal to the ceramic. This method has been described and claimed in U.S. Patent No. 2,667,427, Nolte, assigned to the same assignee as the present invention, and is a desirable method of metalizing in that it affords an adherence or interlock of metal particles with the ceramic at the surface of the body and in that it involves only a single heating step.

As environmental and tube operating conditions have become more severe, however, ceramics possessing improved mechanical and electrical properties have become desirable. One method of obtaining these desirable properties has been to manufacture the ceramic insulators with an increased proportion of crystalline-to-glass phase or to fabricate the insulators as single crystal or polycrystalline bodies containing no glassy phase. In general it has been found that the mechanical and electrical properties of alumina ceramics are improved as the alumina content is increased to approximately 96% and above.

Heretofore, however, as the alumina content of a ceramic member was increased in order to improve the properties of the insulator as described above it became increasingly more difficult, and higher sintering temperatures were required, to provide the surface of such a member with the adherent refractory metalizing coatings essential to effect ceramic-to-ceramic or ceramic-to-metal seals. For example, in the case of a ceramic having an alumina content of about 85% it has heretofore been possible to apply an adherent refractory metalizing coating or layer by relying substantially completely upon a thermochemical reaction of the metallic constituents of a molybdenum-manganese mixture or oxides derived therefrom with the glassy phase contained in the ceramic at a temperature of approximately 1250° C. This reaction manifested itself as the formation of a liquid phase between the glass phase of the ceramic and the manganese oxide formed by oxidation of the elemental manganese in a water vapor-containing hydrogen sintering atmosphere. As the alumina content of the ceramic is increased to approximately 95% a temperature of approximately 1550° C. is required in order to obtain sufficient reaction between the aforementioned metalizing coating and the surface of the ceramic due to the considerably reduced quantity of glassy phase contained in the ceramic and its increased refractoriness. I have observed that as the alumina content of the ceramic is increased beyond 95% the ceramic contains insufficient glassy phase to permit the desired reactions to occur in a manner which can be easily controlled and reproduced. Additionally, the substantially high temperatures that would be required to effect a reaction would also cause undesirable softening and distortion of the ceramic. Further, methods and materials heretofore employed have in some cases required a plurality of heating steps and in some other cases fostered electrolysis and ionic conduction which are generally intolerable in ceramic elements adapted for serving as insulators in electric discharge devices. Still further, many prior art metalizing compositions are not suitable for use with hard solders, or solders having melting points above approximately 427° C.

Accordingly, a primary object of my invention is to provide new and improved sealing means adapted for making more practical the use in electric discharge devices of insulators formed of a ceramic having a greater ability to withstand higher temperatures and to afford lower power losses, greater mechanical strength, and higher thermal shock resistance.

Another object of my invention is to provide a new and improved metalizing composition and method of metalizing a ceramic body which, regardless of the alumina content of the body, produces a metallic coating tightly adherent to the ceramic and adapted for use in effecting vacuum-tight ceramic-to-ceramic and ceramic-to-metal seals.

Another object of my invention is to provide a new and improved metalizing composition and method of metalizing a ceramic body adapted for effecting desired reactions of materials to provide a satisfactory metalizing coating at a relatively low temperature for, thus, facilitating and reducing the cost of the metalizing operation and improving the quality of the metalized body by avoiding undesirable thermal softening and distortion of the ceramic body and by effecting higher strength and more tightly adherent metal coatings.

Another object of my invention is to provide a new and improved ceramic member including a metalized area which can be effectively utilized for making a seal and which will not have undesirable effects on the processing of the ceramic body or the processing or operation of an electric discharge device incorporating the ceramic body as an insulator.

Another object of my invention is to provide an improved ceramic insulator including a metallic coating which is free of materials which could result in the undesirable effects of electrolysis and ionic conduction during operation of an electric discharge device incorporating the insulator.

Another object of my invention is to provide an improved ceramic metalizing material and method adapted for affording dense, smooth, continuous, non-porous and conductive coatings on selected areas on ceramic bodies including bodies of very high alumina content.

Another object of my invention is to provide an improved ceramic metalizing material and method effective for providing a metalized coating which is not glazed and, thus, is more readily wettable by brazing materials used with such coating to effect a seal.

Another object of my invention is to provide an improved ceramic metalizing material and method adapted for providing a metalized coating by means of a single heating step and wherein are utilized materials which are not subject to substantial chemical reduction with consequent volume change and, thus, better assure consistency in thickness between different metallic layers provided on ceramic bodies coated by the same mixture.

Another object of my invention is to provide a new and improved metalizing material and method adapted for providing a metalized coating particularly suitable for use with hard solders.

Further objects and advantages of my invention will become apparent as the following description proceeds and the features of novelty which characterize my invention will be pointed out with particularity in the claims annexed to and forming part of this specification.

In accordance with an important aspect of my invention and in order to carry out the objects of my invention, I provide an improved metalizing mixture including a composition of materials which produces a desired liquid phase at a relatively low temperature and which does not rely on the constituents of the ceramic being metalized to contribue to the formation of the liquid phase. The mixture according to my invention is powdered and consists essentially of up to about 40 weight percent manganese particles, from about 50 to about 90 weight percent of a powdered refractory metal selected from the group consisting of molybdenum and tungsten and combinations thereof and from about 1 to about 50 weight percent of a powdered low-alkali, lead-free, borosilicate glass wherein silica is the major constituent. By means of the composition including such metals and glass and predetermined compounding of the metalizing mixture, I obtain, upon heating during a single heating step in a non-oxidizing atmosphere, a reaction of the metalizing mixture with the ceramic and sintering of the metallic constitutents at a temperature which is independent of the maturing temperature of the ceramic. By providing the glass in the metalizing mixture I am able to metalize pure sintered polycrystalline alumina ceramics as well as single crystal synthetic sapphire (alumina) materials which are devoid of any glassy phase and heretofore impossible to metalize by known refractory metalizing processes. With the use of the same composition, I am able to metalize other polycrystalline and polyphase ceramics of low or no glass content, such as sintered forsterite bodies. In accordance with a second important aspect of my invention I am able by including in my composition powdered metal which is readily wetted by solder materials to obtain metalized areas which are readily wettable by solder materials without prior electrode-position of a known wettable substance.

My invention will be better understood after first considering the inherent limitations of prior art metalizing compositions and the thermochemistry of the metalizing process involved in the use thereof. As mentioned above, the formation of a liquid phase during the sintering operation is necessary in order to effect the necessary chemical reactions which lead to bonding of the refractory metal particles to the ceramic surface.

If a prior art metalizing composition, such as one containing as its only essential ingredients 80% molybdenum and 20% manganese, is applied to the surface of an alumina ceramic and heated in a hydrogen atmosphere, the elemental manganese is oxidized to MnO, an oxide having a melting point of 1785° C. Several additional reactions are possible depending upon the composition of the ceramic and the temperature.

If the ceramic contains only aluminum oxide, such as synthetic sapphire or polycrystalline sintered alumina, no liquid phase is formed until a temperature of 1520° C. is attained, the eutectic temperature between MnO and $Al_2O_3$. Aluminum oxide has a melting point of 2050° C. Although a liquid phase is formed at this high temperature, difficulty is experienced in obtaining a bond between the refractory metal particles and the surface of the ceramic because of the fluidity of the eutectic liquid which is produced and the tendency thereof to flow out over the surface of the ceramic. Although some metal particles may lie in this liquid surface layer which will crystallize during cooling, the metalizing layer will be very poorly bonded, will be undesirably porous, and will be insufficiently dense and non-uniform across the metalized area.

I have observed that if some silica is present in the ceramic a liquid phase will be formed at a temperature of only about 1200° C., the eutectic temperature between MnO and $SiO_2$. MnO also forms low melting eutectics with MgO and CaO, two oxides found in most commercial alumina ceramics. Thus, as the alumina content of the ceramic is reduced by the introduction of silica and alkaline earth oxides, as is commercially practiced to reduce the maturing temperature of the ceramic, this replacement would have the effect of reducing the required metalizing temperature. For example, an alumina ceramic of 85% alumina content contains a sufficient quantity of glassy phase to permit the formation, by reaction with the MnO derived from the metalizing coating, of the necessary amount of liquid phase at a temperature of about 1250° C.

Alumina ceramics of 95% alumina content contain a considerably lesser quantity of glassy phase and this phase is substantially more refractory than in 85% alumina type bodies. Consequently, a temperature of about 1550° C. is required with the prior art methods in order to effect the desired reactions between the ceramic and the metalizing coating. Thus, as the maturing temperature of alumina ceramics is increased from, for example, approximately 1450° C. to 1650° C., due to increased alumina content from 85% to 95%, the sintering temperature for many prior art metalizing mixtures (for example 80% molybdenum and 20% manganese) must be increased from approximately 1250° C. to 1550° C. If a ceramic of the 85%–95% alumina type is heated to a temperature near its maturing temperature, sufficient softening of the glassy phase thereof will occur to permit reaction with and penetration by particles of molybdenum or tungsten with no other materials being present in the metalizing coating. Although this is the principle underlying several other prior art metalizing methods, small additions are often made, for example, powered iron, to promote sintering and densification of the very refractory molybdenum or tungsten particles.

Although 85% alumina content ceramics can be metalized at a desirably low temperature, their properties are inadequate for many tube applications. Ceramics possessing improved properties, i.e., those containing approximately 95% alumina have heretofore required undesirably high metalizing temperatures, i.e., about 1550° C., in order to obtain adequate adherence; a temperature which often resulted in softening and distortion of the ceramic. Alumina ceramics possessing the most desirable mechanical and electrical properties, those containing about 95% to about 100% aluminum oxide cannot be satisfactorily metalized at any temperature with prior art materials and methods.

By providing in my improved metalizing mixture a material which will, by reaction with MnO, form a ceramic-penetrating liquid phase and will react with the ceramic at a relatively low temperature, the need for a high metalizing temperature is eliminated. I provide such a material in the form of a lead-free, low-alkali, borosilicate glass having a relatively low viscosity and high chemical reactivity at the desired sintering temperature of the metallic constituents of the metalizing coating. The glass is selected to contain a high percentage of the desirable glass-forming oxide $SiO_2$, a lesser amount of boric oxide, and may contain one or more of the alkaline earth oxides as well as very small amounts of the alkali metal oxides. Advantage is taken of the marked lowering in the melting point of silicon dioxide by boric oxide to provide a glass having a low softening point without the necessity for employing appreciable quantities of the alkali metal oxides $Na_2O$ and $K_2O$ which are generally used for reducing the melting temperatures of silicate glasses. It is to be understood that the term "melting point" is herein employed to mean the point at which the glass will flow and react with other materials to form a desired interface. It is not used in its highly technical glass art sense in which it means the temperature at which glass-forming materials react to form glass. The alkali metal oxides are undesirable because of their deleterious effect on the dielectric properties and volume resistivity of glasses which in turn would have like undesirable effects on a metalized area of a ceramic. A ceramic so undesirably affected could result in undesirable electrical effects in an electric discharge device. Glasses having reduceable constituents such as lead oxide or oxides having high vapor pressures are also avoided for thereby avoiding the deposition of conductive films across the unmetalized wall areas of the ceramic which could result in short circuiting of electrodes and cracking of the ceramic in an electric discharge device as well as contamination of a furnace atmosphere.

My invention will be still better understood by consideration of some specific examples of metalizing mixtures and methods of applying same and seal structures obtainable therewith. Also, for a better understanding of my invention and the application thereof to the fabrication of composite metal-to-ceramic and ceramic-to-ceramic structures reference may be had to the accompanying drawing wherein.

In preparing my improved metalizing mixture I have found particularly suitable a lead-free, low-alkali, borosilicate glass having the following chemical composition and obtainable under the code number 7740 from the Corning Glass Works of Corning, New York:

| | Weight percent |
|---|---|
| $SiO_2$ | 80.5 |
| $B_2O_3$ | 12.9 |
| $Na_2O$ | 3.8 |
| $K_2O$ | 0.4 |
| $Al_2O_3$ | 2.2 |

This material is not characterized by a sharp melting point but softens gradually with an increase in temperature. Although this glass is sufficiently fluid at a temperature of approximately 1250° C. to produce the desired reaction with and corrosion of the surface of alumina ceramics to provide a vacuum-tight reaction product effective for bonding metallic particles to the ceramic, advantages accrue from the use of manganese or oxides of manganese in combination with the glass, as will be pointed out in detail hereinafter. However, it is to be noted that no substantial amount of an oxide of manganese is used in the metalizing material since such would posses low bulk density and, thus, adversely affect the ease of controlling the final thickness of the coating.

Figure 1:
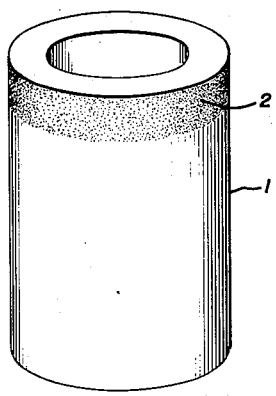
FIGURE 1 is a perspective view of a ceramic cylinder metalized at one end in accordance with my invention.
Figure 2:
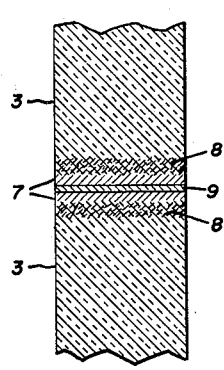
FIGURE 2 is an enlarged fragmentary sectional view showing a seal between a pair of metalized ceramic members.
Figure 3:
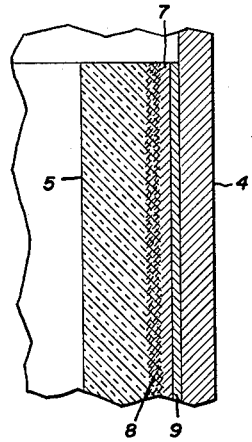
FIGURE 3 is an enlarged fragmentary sectional view of a seal between a metalized ceramic member and a metal member.
Figure 5:
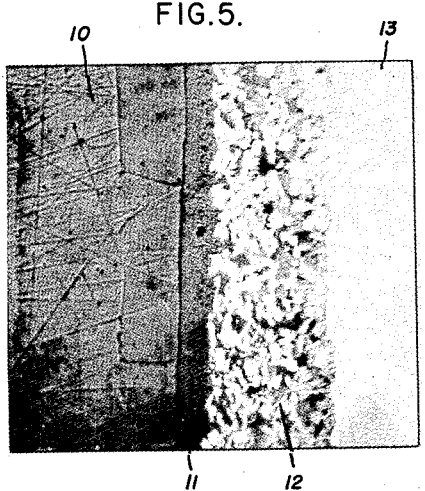
FIGURE 5 is a photomicrograph similar to that of FIGURE 4 but wherein the ceramic has a 100% alumina content.

Illustrated in FIGURE 1 is a ceramic member 1 prepared according to an embodiment of my invention and wherein the metalized area comprises an annular outer surface portion 2. Illustrated in FIGURE 2 are a pair of ceramic members 3 having abutting end surfaces metalized and sealed according to my invention; and shown in FIGURE 3 are metal and ceramic sections 4 and 5, respectively, with the ceramic section 5 metalized and these members joined according to my invention. The ceramic bodies designated 1 in FIGURE 1, 3 in FIGURE 2, and 5 in FIGURE 3, can comprise bodies having up to 100% alumina content.

Figure 4:
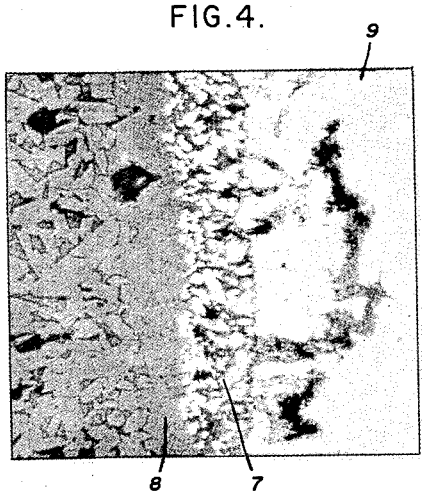
FIGURE 4 is a photomicrograph of a 94% alumina ceramic processed in accordance with my invention and illustrating a coating of filler metal for effecting a bond to either another metalized ceramic or a metal member.

FIGURE 4 is a photomicrograph magnified 500 times of a polished section of a metalized ceramic of the types shown in FIGURES 1–3. The ceramic of FIGURE 4 is of the 94% alumina content and the metalizing layer was sintered to the ceramic at a temperature of 1250° C. in a hydrogen furnace for a period of approximately 45 minutes. The resultant metalized layer is non-glassy and conductive. The metalizing mixture used had the following composition:

*Composition A*

| | Weight percent |
|---|---|
| Elemental molybdenum, powdered | 62.8 |
| Elemental manganese, powdered | 29.7 |
| Corning Glass No. 7740, powdered | 7.5 |

In Composition A the indicated percentages of materials are approximate. Additionally, approximately 62.8 weight percent of powdered tungsten or combinations of powdered tungsten and molybdenum can be substituted for the powdered molybdenum. In FIGURE 4 the alumina ceramic is designated 6 and is polyphase. A sintered molybdenum layer 7 is held in place by an interface 8 comprising a crystalline reaction product of glass, manganese and alumina. A layer of eutectic silver-copper filler alloy 9 is provided for bonding to the molybdenum layer either another metalized ceramic of the type shown in FIGURE 2 or a metallic member of the type shown in FIGURE 3 and which can advantageously comprise a copper-clad chromium-iron sleeve. Actually, such a metal sleeve was bonded to the molybdenum layer 7 by the solder 9; however, to include it in the photomicrograph would render the latter prohibitively large for a patent drawing where it is desired to retain substantial magnification to illustrate the metalized section. In FIGURE 4 the reaction product interface 8 comprises the manganese oxide and the borosilicate glass which have reacted to form a corrosive liquid which, in turn, has effected the desired reaction with the surface of the ceramic. In addition, a crystalline phase has been formed in the interface layer 8 at the sintering temperature or during cooling. The result is a non-porous interface material consisting almost wholly of crystals, a structure similar in its physical characteristics to that which exists in the bulk ceramic comprising the insulator proper. The effect of the crystalline interface is to strengthen substantially the bond between the particles of refractory metal and the surface of the ceramic over that which would be obtained if manganese were not present in the metalizing mixture. Additionally, substantial portions of the molybdenum extend outwardly of the reaction product so as to present a conductive metalized surface as distinct from glazed, nonconductive surfaces obtainable with some prior methods. Further, the reaction product interface 8 is non-porous which contributes substantially to the vacuum tightness of the seal and eliminates reliance on flow of solder material into a porous surface to effect a vacuum-tight condition. This also minimizes solder requirements to effect a satisfactory seal.

It is to be understood that the metal particles of my metalized area are not merely sintered to the surface of the ceramic or a glass or reaction-product covered ceramic. This would result in the porous type of structure referred to above and the undesirable effects thereof. Instead, and as pointed out above, my metalizing mixture and the method of metalizing results in a structure wherein the metal particles are dispersed in the reaction-product interface 8 but are sufficiently exposed through the surface of the interface as to present a metallic, non-glassy, conductive coating. The conductive nature of this coating is highly desirable and advantageous in that it is adapted for being electroplated without previous burnishing, chemical treatment or deposition of another coating of conductive material. Thus, my mixture and method are adapted for providing a strongly adherent, conductive, metallic coating by means of only single coating and heating steps.

When the ceramic contains some interstitial glass or glassy phase, as in 94% alumina ceramic, the reacting liquid resulting from chemical combination of the glass and manganese vigorously attacks and dissolves the interstitial glass causing the resultant liquid to penetrate deeply into the ceramic between refractory corundum grains, as can be seen in the photomicrograph of FIGURE 4. If the ceramic contains little or no glassy phase, the reacting liquid from the metalizing mixture dissolves the ceramic in a more or less uniform manner and penetration of the liquid between grains is less pronounced. This can be seen in FIGURE 5 which is a photomicrograph of a substantially glass-free polycrystalline sintered alumina body 10 of high purity bearing an area metalized according to my invention and adapted for being sealed by a filler material to either another metalized ceramic member or a metal member. The interface layer designated 11 comprises a reaction product between the glass and manganese of the mixture and the corundum at the surface of the ceramic body and can be seen to consist of crystals dispersed in a glassy phase as was also shown in the seal of FIGURE 4. The apparent sharp line of division between 10 and 11 results from the polishing operation on the sample and was caused by the difference in hardness between the two materials and does not signify a real line of division of materials or a physical separation of materials 10 and 11. In a manner similar to that found in the seal of FIGURE 4, a sintered molybdenum layer 12 is held in place by the reaction product and is adapted for having another metalized ceramic member or a metal member (not shown) bonded thereto by means of a eutectic silver-copper filler alloy or another hard solder 13. The molybdenum layer 12 is metallic and conductive and, if desired for the purpose of facilitating the brazing operation, the layer 12 can be electroplated or otherwise coated with a layer 14 of nickel or any other suitable solder-wettable metal in the manner shown in FIGURE 6 and for the purpose of increasing the wetting action of the brazing material. Additionally, the interface 11, because of its crystalline structure, approaches the strength of the crystalline ceramic body.

In obtaining the metalized coating it is desirable to provide a relatively long sintering period in order that the solution and crystallization process just described will be permitted to approach equilibrium. This crystallization process results in an interface which not only possesses improved mechanical strength and heat shock resistance but apparently also provides a gradation in thermal expansion between the sintered metal particles and the bulk ceramic which further contributes to the high seal strengths which have been obtained with my invention. The metalizing layers of the seals shown in the photomicrographs were sintered for 45 minutes, for example, at a temperature of about 1250° C.

During the single heating step required for my method the fluid glass and manganese promotes sintering of the refractory metal particles to form a continuous but somewhat porous conductive metal layer with the pores being filled with the same non-porous reaction product material as contained in the interface zone. Upon cooling to room temperature the ceramic-like material in the pores and in the interface region solidifies for thus assuring a dense, tightly bonded, well-sintered, metal layer free from undesirable porosity which could cause non-vacuum tight seals. The brazing alloy which is used to joint the metalized ceramic to adjacent metal or ceramic parts is merely required to wet and bond to the outer surface of the refractory metal layer and need not perform the difficult task of penetrating into and filling the interstices which would exist between particles if sufficient liquid were not present at the sintering temperature to fill the pores between metal particles. It is equally important, however, that the composition of the metalizing mixture does not result in the formation of an excess of liquid which would undesirably extend as a non-conducting layer over the outer surfaces of the sintered metal particles and thus inhibit subsequent electroplating and brazing operations by rendering the outer surface of the coating non-conductive. With my composition the resultant liquid is not excessive and the metal particles are sufficiently exposed on the outer surface of the coating to provide a continuous, abrasion-resistant, conductive outer surface.

From the preceding discussion it can be readily understood that the refractory metal particles sinter together to form a conducting metal layer to which brazing fillers will wet and bond while the purpose of the manganese and lead-free, low-alkali, borosilicate glass is to provide a particular reaction product which effects a vacuum-tight bond between the sintered metal layer and the ceramic and assumes a crystalline structure closely approaching the strength of ceramic.

In practicing my invention the ratio of metal-to-glass in the metalizing coating is determined by such factors as the composition and particle size of the metal, the chemical and crystallographic composition of the ceramic, and the metalizing temperature to be employed. For example, a metalizing mixture having the following composition has been found to provide a suitable metalizing layer on an alumina ceramic containing 85% to 94% alumina when sintered at a temperature of about 1250° C.

*Composition B*

| | Weight percent |
|---|---|
| Molybdenum, powdered | 61 |
| Manganese, powdered | 25 |
| Corning Glass No. 7740, powdered | 14 |

In this composition also the indicated percentages of the ingredients are approximate. Also, approximately 61 weight percent of powdered tungsten or a combination of powdered molybdenum and tungsten can be substituted for the 61 weight percent powdered molybdenum. If the above-cited Composition B were applied to a ceramic having an alumina content of 96% or greater, the large amount of liquid which would be formed at the sintering temperature would probably not, in the sintering time usually employed, react sufficiently to avoid leaving a thin non-conducting coating over the refractory metal layer which would inhibit plating or brazing. However, by reducing slightly the amount of glass used, a metalizing material will be obtained which can be applied to alumina ceramics without regard to alumina content and yet not form a high resistivity surface coating. A composition having a reduced amount of glass and satisfactory for effectively metalizing ceramics regardless of alumina content was described above and designated Composition A.

In metalizing mixtures prepared according to my invention and containing manganese and borosilicate glass, both of these materials contribute to the formation of the liquid phase which is present at the sintering temperature. Thus, if the glass content is increased, the manganese content should be reduced. For example, another satisfactory composition which has been employed to metalize alumina ceramic is as follows:

*Composition C*

| | Weight percent |
|---|---|
| Molybdenum, powdered | 70 |
| Manganese, powdered | 15 |
| Corning Glass No. 7740, powdered | 15 |

In this composition also the indicated weight percentages of material are approximate. Also approximately 70 weight percent of powdered tungsten or a combination of powdered molybdenum and tungsten can be substituted for the indicated 70 weight percent of the powdered molybdenum. It has been found that the structure of the reaction product interface is determined by the glass-to-manganese ratio; high glass contents promoting the formation of a glassy interface containing a minimum of crystalline species while high manganese contents result in interface layers containing a high percentage of crystalline material and thus physically stronger. Both types of interface layers will satisfactorily adhere to the refractory metal without rendering same non-conductive and will serve well to effect a vacuum tight seal. However, for the reasons mentioned above, it is desirable, from the standpoint of seal strength, to obtain an interface consisting of a high proportion of crystalline species bonded by a lesser amount of glassy phase, a structure simulating that which is found in dense, high-strength, alumina ceramics of the 95% or higher alumina types.

Metalizing coatings which were satisfactory for some purposes have been prepared containing a total manganese and glass content considerably less than that contained in my preferred Composition A. Examination of polished sections (not shown) made from seals to such coatings show that the interface layer is thinner and penetration of the reacting liquid between grains of alumina (as in 95% alumina type ceramics) is less pronounced. In addition, the sintered refractory metal layer contains more pores which are open to the surface and which must be filled with the solder metal during brazing in order to assure vacuum tight seals. Thus, it is generally preferable, for example, in high-vacuum electric discharge devices that the metalizing mixtures contain amounts of the interface-forming ingredients borosilicate glass and manganese which will result in an amount of reaction product such that the pores of the sintered metal layer are almost completely filled. Such a condition assures that, for any thickness in excess of that needed to cover the ceramic surface with a layer of metal particles, the seal will be vacuum tight. However, the reaction product must not be so great in quantity as to overflow the metal particles and render the surface of the metalized coating glassy and non-conductive.

As previously mentioned, the manganese metal is oxidized to manganous oxide upon contact with water vapor or oxygen, small amounts of which are normally contained even in the usual non-oxidizing sintering atmosphere. If extremely dry hydrogen is used the manganese obtains sufficient oxygen from the glass additive and/or the constituents of the ceramic to form an oxide. However, it has been determined by X-ray diffraction analyses that no great amount of manganese oxide per se is present in the interface or reaction product.

Although the sintering operation is most conveniently performed in an atmosphere of hydrogen, other atmospheres which will prevent excessive oxidation of the refractory metal constituents may be employed. In contrast to some prior art metalizing processes, the dew point of an hydrogen atmosphere suitable for preparing adherent coatings according to my invention is not critical and dew points from minus 80° F. to plus 70° F. have been used effectively.

If a metalizing material should be prepared according to the above procedure, for example, by use of my preferred Composition A, the maximum thickness of applied coatings will be found to be less critical. Equally satisfactory seals have been made to coatings having a sintered thickness of .005 in. as from coatings of .001 in. thickness. Due to the difficulty of applying a uniform coating .005 in. thick, such thicknesses are seldom employed. The advantage remains, however, of being assured of vacuum tight seals in the event that processing variations result in coatings of this thickness. The preferred thickness is .001 to .003 in. If care is taken to obtain a uniform coating, satisfactory seals can be made to coatings of only .0003 in. thickness. If, however, the coating is non-uniform in thickness, resulting in portions of the surface being not covered by metal, the strength of the resulting seal will be reduced.

Most of the preceding discussion has centered about the use of molybdenum as the highly refractory metal ingredient of my metalizing mixture. As mentioned above, however, suitable metalizing coatings can be prepared using tungsten and combinations of molybdenum and tungsten. Tungsten behaves similarly to molybdenum in metalizing coatings prepared according to my invention and may be substituted for molybdenum in whole or in part with no change in the metalizing procedure.

Additionally, whereas metalizing layers prepared with the metals molybdenum and tungsten generally require the subsequent application of a layer of copper or nickel in order to promote wetting by commonly used brazing metals, I have found that this is not necessary if a quantity of powdered nickel is mixed with the molybdenum or tungsten.

A composition of this type which has been employed effectively is as follows:

*Composition D*

| | Weight percent |
|---|---|
| Molybdenum, powered | 33 |
| Nickel, powdered | 30 |
| Manganese, powdered | 30 |
| Corning Glass No. 7740, powdered | 7 |

With the coating of Composition D the very highly refractory molybdenum particles prevent excessive sintering of the nickel while the presence of the nickel promotes wetting and flow of brazing filler metals without the need for prior treatment of the sintered metal surface as, for example, by electro or electroless nickel or copper plating or by sintering powdered elemental metals or reduced oxides to the previously metalized layer. In Composition D also the indicated weight percentages of ingredients are approximate. Also, if desired, approximately 33 weight percent of powdered tungsten or a combination of powdered molybdenum and tungsten can be substituted for the 33 weight percent of molybdenum indicated above.

Figure 6:
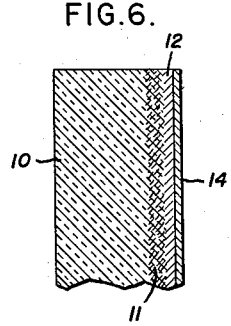
FIGURE 6 is an enlarged fragmentary sectional view of a metalized ceramic obtainable according to a modified form of my invention.

However, if the application of a layer of copper or nickel of the type designated 14 in FIGURE 6 should be considered desirable for a particular seal construction, such can be obtained simply by an electroplating step which is made possible by the conductive nature of the metalizing layer obtained with my metalizing mixtures and method. The thus obtained layer is then sintered to the metalizing coating at a temperature of about 1000° C. in an atmosphere of hydrogen. If a solder or brazing material is used which will wet the molybdenum or tungsten surface or if nickel is admixed with these metalizing materials, this electroplating is, of course, not necessary.

For application to ceramic shapes the metalizing compositions above described can be prepared as suspensions in a liquid vehicle containing an organic binder. The consistency or viscosity of the metalizing mixture can be adjusted to suit the particular method of application to be employed. Shapes may, for example, be coated by dipping, brushing, spraying, printing and silk screening. The consistency of a mixture suitable for dip coating, spraying, or brushing application should, for example, have a consistency comparable to that of paint, while a coating intended for application by silk screening should, for example, have a thin paste-like consistency.

The amount of vehicle determines the viscosity or consistency of the metalizing mixture while the vapor pressure of the vehicle determines the drying time. For the application of metalizing coatings by dipping or brushing a relatively fast drying vehicle is generally desired and may be selected from the group including acetone, amyl acetate, xylene, or other suitable organic vehicles having a vapor pressure of about 10 mm. Hg at 20° C. or greater. Where large areas are to be covered with a uniform metalizing layer, it is generally preferable to employ a slow drying coating in which case the vehicle may be "Cellosolve" solvent, methyl, amyl acetate or other vehicle having a vapor pressure from 1 to 10 mm. Hg. "Cellosolve" is a commercially available solvent of the Carbide and Carbon Chemicals Division of the Union Carbide and Carbon Corp. of 30 East 42nd Street, New York, N.Y. For application of a metalizing coating by printing or silk screening technique, it is generally desirable to employ a very slow drying coating in order to prevent drying of the metalizing mixture in the equipment. Suitable vehicles for this type of application include butyl "Carbitol," butyl "Carbitol" acetate, or other vehicle having a vapor pressure of less than about 0.1 mm. Hg. "Carbitol" is also available through the same source as "Cellosolve."

In order to increase the cohesive and adhesive strength of the metalizing coating, it is generally desirable to add a suitable binder to the metalizing mixture. Although small amounts of certain inorganic binders could be employed, it is generally preferable to use an organic binder which will undergo thermal or chemical decomposition during the first stages of heating and will be completely evolved before the coating reaches the desired sintering temperature for thus avoiding any inhibition of the sintering operation. Suitable binders include methyl methacrylate, isobutyl methacrylate and nitrocellulose as well as others known to those skilled in the art.

Inasmuch as it is generally necessary to prepare the metalizing mixture in several different consistencies and with several different vehicles, it is convenient to store the metalizing composition, after ball milling, as a dry powder. To this homogeneously mixed powder can then be added the proper vehicle and binder in the amounts necessary to yield the desired consistency for the intended application. The required quantity of powder, vehicle and binder should be rolled, ball milled, or otherwise mixed to assure a homogeneous dispersion of the several constituents.

For example, a prepared powdered low-temperature metalizing mixture including the weight percent constituents of my Composition A can be obtained by introducing the following ingredients into a suitable ball milling device:

| | |
|---|---|
| Manganese metal powder, 325 mesh____grams__ | 178.2 |
| Molybdenum metal powder, 325 mesh____do____ | 376.8 |
| Corning Glass No. 7740 powder, 325 mesh_do____ | 45.0 |
| Amyl acetate_____ml__ | 240 |

The above mixture is then ball milled for approximately 140 hours and after milling the mixture is removed from the mill and the amyl acetate is removed. This removal of the amyl acetate can be accomplished by allowing the amyl acetate to evaporate and can be expedited by decanting the liquid in any suitable manner after the solid materials have been settled out of the mixture. Drying can also be hastened by application of heat and stirring of the drying powder mixture. The resultant dried powder constitutes the metalizing mixture to which can be added a vehicle in desired quantities for obtaining consistencies suitable for application by dipping, brushing, spraying, printing, or silk screening.

A suitable slow drying composition can be obtained by mixing and rolling in a jar roller together for approximately 24 hours the following ingredients:

| | Grams |
|---|---|
| Prepared metalizing powder (Composition A)_____ | 140 |
| Binder solution_____ | 40 |
| "Cellosolve" solvent_____ | 10 |

This mixture can be adjusted to a desirable density of approximately 2.4 g./cc. prior to use and by using "Cellosolve" solvent as a thinner.

The above-noted binder solution can be obtained for use in the slow drying composition by mixing for approximately 24 hours the following ingredients:

| | Grams |
|---|---|
| Isobutyl methacrylate_____ | 40 |
| "Cellosolve" solvent_____ | 200 |

If a fast drying composition is desired a suitable metalizing mixture can be prepared by mixing the following ingredients:

| | Grams |
|---|---|
| Prepared metalizing powder (Composition A)_____ | 200 |
| Binder solution_____ | 50 |

The binder solution can be similar to that set out above for a slow-drying mixture including the 40 grams of isobutyl methacrylate but using a faster-drying solvent such as one made up of equal parts of acetone and xylene. Prior to use, this mixture can be adjusted to a desired density such, for example, as 2.8 g./cc.

If it is desired to provide a metalizing composition suitable for silk screen printing of a metalizing coating on a ceramic the composition can be prepared by mixing and rolling together the following ingredients:

| | Grams |
|---|---|
| Prepared metalizing powder (Composition A)_____ | 100 |
| Binder solution_____ | 33 |

The binder solution here can effectively comprise a suitably mixed mixture of the following:

| | Grams |
|---|---|
| Butyl "Carbitol" acetate_____ | 100 |
| Isobutyl methacrylate_____ | 30 |

It is to be understood that any of the above-disclosed compositions is employable in making the above set forth liquid preparations and that Composition A has been specifically referred to only by the way of example.

The above-detailed discussion has been included in the specification to put the production of satisfying metalizing and seals in accordance with applicant's invention on a scientific and controllable basis as well as to disclose the nature of the process and compositions required for successful metalizing and sealing. The above discussion, considered together with the various specific examples and compositions given to illustrate practical limits on the bonding process for particular materials will serve to demonstrate the scope of the present invention and provide a practical guide for obtaining the desired quality of metalizing and seals.

As pointed out above, the metalizing layers and seals obtainable with my invention are believed to be particularly adapted for avoiding mismatch between the thermal expansion characteristics of the ceramic and the materials comprising the metalizing layers. However, as will be readily appreciated by those skilled in the art, in making bonds to the metalizing layers, due consideration should be given to the degree of mismatch between the thermal expansion characteristics of the ceramic and the metal or ceramic members bonded thereto as well as to the actual design of the seals to minimize difficulties resulting from mismatch.

While I have shown and described specific embodiments of my invention, I do not desire my invention to be limited to the particular forms shown and described, and I intend by the appended claims to cover all modifications within the spirit and scope of my invention.

What I claim as new and desire to secure by Letters Patent of the United States is:

1. The method of providing a vacuum-tight, electrically-conductive metallic coating on a surface of a crystalline ceramic member which consists of the steps of applying to said surface a mixture of powders consisting essentially of elemental manganese, an elemental metal selected from the group consisting of molybdenum and tungsten and combinations thereof, a low-alkali, lead-free, borosilicate glass wherein silica is the major constituent, said manganese comprising up to about 40%, said other metal comprising from about 50% to about 90% and said glass comprising from about 1% to about 50% by weight of said mixture, heating said member and applied mixture of powders in an atmosphere non-oxidizing to said metal and to a temperature of at least approximately 1250° C. at which said glass will react with said manganese and the surface portion of said ceramic to provide a vacuum-tight, crystalline reaction-product interface bonding said metals to said ceramic as a tightly adherent metallic coating.

2. The method according to claim 1 wherein the powdered metal comprising about 50% to about 90% by weight of said mixture further includes a metal which is readily wetted by solder materials.

3. A metalized ceramic structure comprising a crystalline ceramic body, an interface on only a surface portion of said ceramic body consisting essentially of a vacuum-tight crystalline reaction product of a low-alkali, lead-free borosilicate glass in which silica is the major constitutent, managanese, and ceramic, and an electrically-conductive metal coating comprising elemental metal particles selected from the group consisting of molybdenum, tungsten and combinations thereof bonded to said ceramic body by said reaction product.

4. A metallized ceramic structure according to claim 3 wherein said ceramic body contains at least 94% alumina.

5. A metalized ceramic structure according to claim 3 wherein said metal coating consists of a mixture of nickel particles and particles of metal selected from the group consisting of molybdenum, tungsten and combinations thereof.

6. A metalized ceramic structure comprising a crystalline ceramic body, an interface on a surface portion of said ceramic body consisting of a vacuum-tight crystalline reaction product of a low-alkali, lead-free, borosilicate glass in which silica is the major constituent, manganese and ceramic, a metalizing layer comprising metal particles selected from the group consisting of molybdenum, tungsten and combinations thereof bonded to said ceramic by said reaction product, and a layer of a metal which is readily wetted by a brazing material extending over and bonded to said metal particles.

7. A seal for a vacuum tube envelope comprising a pair of sections having opposed surfaces along a sealing joint, at least one of said sections being of a crystalline ceramic, an interface on the surface of said ceramic section consisting essentially of a substantially wholly crystalline, vacuum-tight reaction product of a low-alkali, lead-free, borosilicate glass in which silica is the major constituent, manganese and ceramic, a metalizing layer comprising highly refractory metal particles bonded to said ceramic by said reaction product with substantial portions of said particles extending outwardly of said reaction product interface and a hard solder bond uniting said metalizing layer and the other of said sections.

8. A seal according to claim 7 wherein said metalizing layer further includes particles of a metal which is readily wetted by said hard solder.

9. A seal according to claim 7 wherein a layer of metal which is readily wetted by said solder is bonded to said metalizing layer and interposed between said metalizing layer and said hard solder.

10. The method of providing a vacuum-tight, electrically-conductive metallic coating on a surface of a crystalline ceramic member which consists of the steps of applying to said surface a mixture of powders consisting essentially of elemental manganese, an elemental metal selected from the group consisting of molybdenum and tungsten and combinations thereof, a low-alkali, lead-free borosilicate glass including approximately 80% silica, said manganese comprising up to approximately 40%, said other metal comprising from about 50% to about 90% and said glass comprising from about 1% to about 50% by weight of said mixture, heating said member and applied mixture of powders in an atmosphere non-oxidizing to said metal and to a temperature of at least approximately 1250° C. at which said glass reacts with said manganese and the surface portion of said ceramic to provide a vacuum-tight, substantially crystalline, reaction-product interface bonding said metals to said ceramic as a tightly adherent metallic coating.

11. The method of providing a vacuum-tight, electrically-conductive metallic coating on a surface of a crystalline ceramic member which consists of the steps of applying to said surface a mixture of powders consisting essentially of elemental manganese and an elemental metal selected from the group consisting of molybdenum and tungsten and combinations thereof, and a low-alkali, lead-free borosilicate glass having approximately the following weight percentage composition:

| | Weight percent |
|---|---|
| $SiO_2$ | 80.5 |
| $B_2O_3$ | 12.9 |
| $Na_2O$ | 3.8 |
| $K_2O$ | 0.4 |
| $Al_2O_3$ | 2.2 | said manganese comprising up to about 40%, said other metal comprising from about 50% to about 90% and said glass comprising from about 1% to about 50% by weight of said mixture, heating said member and applied mixture of powders in an atmosphere non-oxidizing to said metal and to a temperature of at least approximately 1250° C. at which said glass will react with said manganese and the surface portion of said ceramic to provide a vacuum-tight, substantially crystalline, reaction-product interface bonding said metals to said ceramic as a tightly adherent metallic coating.

12. The method of providing a vacuum-tight, electrically-conductive metallic coating on a surface of a crystalline ceramic member, which consists of the steps of applying to said surface a mixture of powders consisting essentially of elemental manganese, an elemental metal selected from the group consisting of molybdenum and tungsten and combinations thereof, a low-alkali, lead-free borosilicate glass wherein silica is the major constituent, said manganese comprising up to about 40%, said other metal comprising from about 50% to about 90% and said glass comprising from about 7% to about 15% by weight of said mixture, heating said member and applied mixture of powders in an atmosphere non-oxidizing to said metal and to a temperature of at least approximately 1250° C. at which said glass will react with said manganese and the surface portion of said ceramic to provide a vacuum-tight, substantially crystalline, reaction-product interface bonding said metals to said ceramic as a tightly adherent metallic coating.

13. A composition for use in metallizing crystalline ceramic bodies comprising a mixture of powdered ingredients consisting essentially of elemental manganese, a low-alkali, lead-free borosilicate glass and an elemental metal selected from the group consisting of molybdenum and tungsten and combinations thereof, said manganese comprising up to about 40%, said other metal comprising from about 50% to about 90% and said glass comprising from about 1% to about 50% by weight of said mixture and having approximately the following weight percentage composition:

| | Weight percent |
|---|---|
| $SiO_2$ | 80.5 |
| $B_2O_3$ | 12.9 |
| $Na_2O$ | 3.8 |
| $K_2O$ | 0.4 |
| $Al_2O_3$ | 2.2 |

14. A composition for metallizing crystalline ceramic bodies comprising a mixture of powdered ingredients consisting essentially of elemental manganese, a low-alkali, lead-free borosilicate glass wherein silica is the major constituent, and an elemental metal selected from the group consisting of molybdenum and tungsten and combinations thereof, said manganese comprising up to about 40%, said other metal comprising from about 50% to 90% and said glass comprising from about 7% to about 15% by weight of said mixture.

15. A composition for metallizing ceramic bodies comprising a mixture of powdered ingredients consisting essentially of approximately 29.7 weight percent of elemental manganese, approximately 7.5 weight percent of a low-alkali, lead-free, borosilicate glass having approximately the following weight percentage composition:

| | Weight percent |
|---|---|
| $SiO_2$ | 80.5 |
| $B_2O_3$ | 12.9 |
| $Na_2O$ | 3.8 |
| $K_2O$ | 0.4 |
| $Al_2O_3$ | 2.2 | and approximately 62.8 weight percent of elemental metal selected from the group consisting of molybdenum, tungsten, and combinations thereof.

16. A composition for metallizing crystalline ceramic bodies comprising a mixture of powdered ingredients consisting essentially of approximately 25 weight percent of elemental manganese, approximately 14 weight percent of low-alkali, lead-free borosilicate glass having approximately the following weight percentage composition:

| | Weight percent |
|---|---|
| $SiO_2$ | 80.5 |
| $B_2O_3$ | 12.9 |
| $Na_2O$ | 3.8 |
| $K_2O$ | 0.4 |
| $Al_2O_3$ | 2.2 | and approximately 61 weight percent of elemental metal selected from the group consisting of molybdenum, tungsten, and combinations thereof.

17. A composition for metallizing crystalline ceramic bodies comprising a mixture of powdered ingredients consisting essentially of approximately 15 weight percent of elemental manganese, approximately 15 weight percent of low-alkali, lead-free borosilicate glass having approximately the following weight percentage composition:

| | Weight percent |
|---|---|
| $SiO_2$ | 80.5 |
| $B_2O_3$ | 12.9 |
| $Na_2O$ | 3.8 |
| $K_2O$ | 0.4 |
| $Al_2O_3$ | 2.2 | and approximately 70 weight percent of elemental metal selected from the group consisting of molybdenum, tungsten, and combinations thereof.

18. A composition for metallizing crystalline ceramic bodies comprising a mixture of powdered ingredients consisting essentially of approximately 30 weight percent of elemental manganese, approximately 30 weight percent of nickel, approximately 7 weight percent of low-alkali, lead-free borosilicate glass having approximately the following weight percentage composition:

| | Weight percent |
|---|---|
| $SiO_2$ | 80.5 |
| $B_2O_3$ | 12.9 |
| $Na_2O$ | 3.8 |
| $K_2O$ | 0.4 |
| $Al_2O_3$ | 2.2 | and approximately 33 weight percent of elemental metal selected from the group consisting of molybdenum, tungsten, and combinations thereof.

19. A composition for metallizing crystalline ceramic bodies comprising a mixture of powdered ingredients consisting essentially of elemental manganese, a low-alkali, lead-free, borosilicate glass wherein silica is the major constituent and an elemental metal selected from the group consisting of molybdenum, tungsten and combinations thereof, said manganese comprising up to about 40%, said other metal comprising from about 50% to about 90% and said glass comprising from about 1% to about 50% by weight of said mixture.

20. A composition for metallizing ceramic bodies according to claim 19, and wherein said mixture further consists of particles of a metal which is readily wetted by solder materials as part of the metallic constituent.

21. A composition for metallizing ceramic bodies comprising a mixture of powdered ingredients consisting essentially of approximately 29.7 weight percent of elemental manganese, approximately 7.5 weight percent of low-alkali, lead-free borosilicate glass including approximately 80 weight percent silica, and approximately 62.8 weight percent of elemental metal selected from the group consisting of molybdenum, tungsten, and combinations thereof.

22. A composition for use in providing vacuum-tight metallic coatings on ceramic bodies comprising a mixture of powdered ingredients consisting essentially of approximately 25 weight percent of elemental manganese, approximately 14 weight percent of low-alkali, lead-free borosilicate glass including approximately 80 weight percent silica, and approximately 61 weight percent of elemental metal selected from the group consisting of molybdenum, tungsten, and combinations thereof.

23. A composition for use in providing vacuum-tight metallic coating on ceramic bodies comprising a mixture of powdered ingredients consisting essentially of approximately 15 weight percent of elemental manganese, approximately 15 weight percent of low-alkali, lead-free borosilicate glass including approximately 80 weight percent silica, and approximately 70 weight percent elemental metal selected from the group consisting of molybdenum, tungsten, and combinations thereof.

24. A composition for use in providing vacuum-tight metallic coatings on ceramic bodies comprising a mixture of powdered ingredients consisting essentially of approximately 30 weight percent of elemental manganese, approximately 30 weight percent of nickel, approximately 7 weight percent of low-alkali, lead-free borosilicate glass including approximately 80 weight percent silica, and approximately 33 weight percent of elemental metal selected from the group consisting of molybdenum, tungsten, and combinations thereof.

References Cited in the file of this patent

UNITED STATES PATENTS

| | | |
|---|---|---|
| 2,304,562 | Gerisch | Dec. 8, 1942 |
| 2,415,036 | Quinn | Jan. 28, 1947 |
| 2,667,427 | Nolte | Jan. 26, 1954 |
| 2,667,432 | Nolte | Jan. 26, 1954 |
| 2,826,512 | Rex | Mar. 11, 1958 |
| 2,898,236 | Long et al. | Aug. 4, 1959 |